United States Patent [19]

Harding

[11] 4,148,680

[45] Apr. 10, 1979

[54] TIRE BUILDING MACHINE

[75] Inventor: Norman B. Harding, Akron, Ohio

[73] Assignee: The Goodyear Tire & Rubber Company, Akron, Ohio

[21] Appl. No.: 884,945

[22] Filed: Mar. 9, 1978

[51] Int. Cl.² .......................................... B29H 17/12
[52] U.S. Cl. .................................. 156/403; 156/131
[58] Field of Search ............... 156/123, 126, 131, 394, 156/398, 403, 400–402, 132

[56] References Cited

U.S. PATENT DOCUMENTS

| | | | |
|---|---|---|---|
| 3,121,653 | 2/1964 | Trevaskis | 156/403 |
| 3,687,779 | 8/1972 | Folden et al. | 156/403 |
| 3,721,600 | 3/1973 | Cantarutti | 156/403 |
| 3,944,456 | 3/1976 | Cantarutti | 156/398 |
| 4,007,080 | 2/1977 | Klopper | 156/126 |
| 4,053,342 | 10/1977 | Appleby et al. | 156/126 |

*Primary Examiner*—John E. Kittle
*Attorney, Agent, or Firm*—R. S. Washburn

[57] ABSTRACT

Means for positioning an assembled bead for a tire which bead includes an inextensible bead core and an apex of an uncured curable rubbery compound which is easily deformed. The assembled bead is first located concentrically of the axis and in a plane perpendicular to the axis of a tire building drum. The bead is then carried from its first location, supported only by the apex, to axial registry around a bead-setting groove of a tire building drum. The groove is expanded radially to conform a tire carcass band to the bead. The bead, being free of supporting devices within, is seated accurately in the carcass overlying the grooves. The foregoing abstract is not to be taken as limiting the invention of this application, and in order to understand the full nature and extent of the technical disclosure of this application, reference must be made to the accompanying drawing and the following detailed description.

1 Claim, 2 Drawing Figures

TIRE BUILDING MACHINE

The present invention relates to tire building machines and particularly to novel and useful means for positioning a tire bead about a tire carcass band disposed in cylindrical form about a tire building drum.

An apparatus in accordance with the present invention finds particular utility in properly disposing a bead circumferentially about a tire carcass band which is disposed in cylindrical form about the drum at a diameter less than the diameter of the tire bead. This arrangement is sometimes referred to as a negative crown building drum or tire building procedure.

A primary object of the invention is to improve the accuracy and reliability with which a bead is seated to be incorporated in the tire carcass.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figures 1, 2:
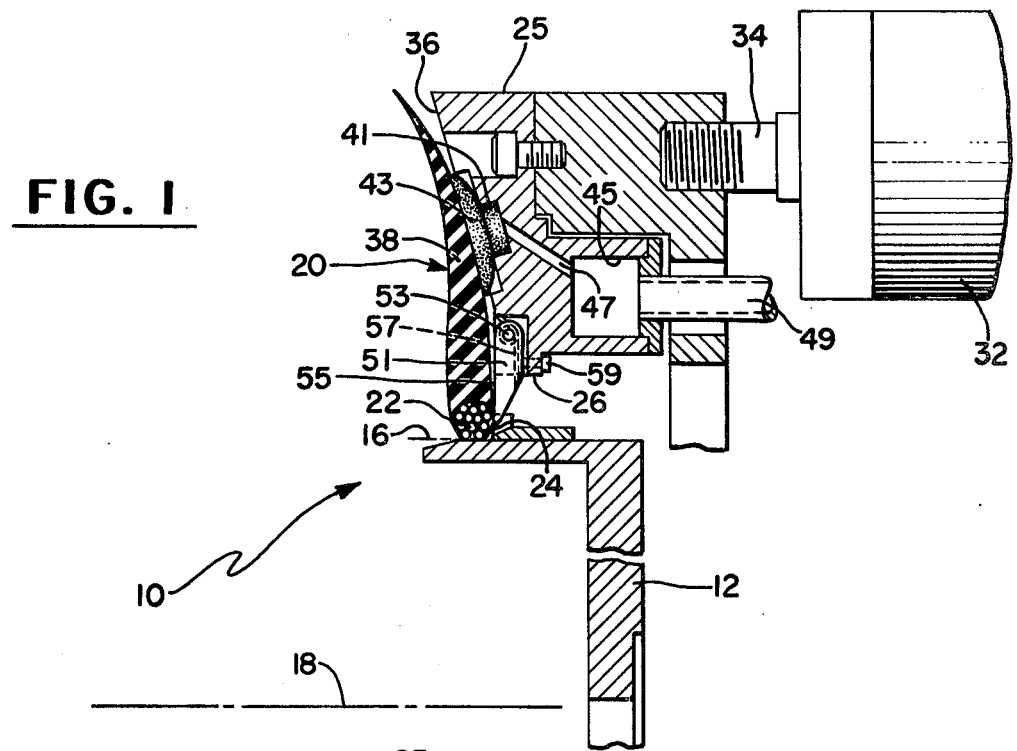
FIG. 1 is a view in axial cross-section of an apparatus in accordance with the invention.
FIG. 2 is a view also in axial cross-section illustrating the apparatus of FIG. 1 in bead-seating register with a portion of a tire building drum.

Referring to the drawings, the apparatus 10 illustrated includes a first annular member 12 disposed coaxially of a tire building drum 14 and fixed to a stationary portion of the tire machine (not shown) at a location spaced apart from the drum. The member 12 is provided with a cylindrical surface 16 which is concentric with the axis 18 of the drum and which surface serves to locate the tire bead 20, and particularly the inextensible bead core 22, concentric with respect to the axis of the drum.

The first member 12 may also include the surface 16 extending at spaced intervals circumferentially of the first member and lying in a plane normal to the axis of the drum. The outermost surface of the first member is limited to a radius which is less than the innermost radius of the second member 25.

The second member is mounted for movement relatively and coaxially of the drum and of the first member and is provided with a radially inner surface 26 which is spaced radially outward of the outer surface of the first member.

In order to move the second member 25 between a first position disposed circumferentially about the first member, as illustrated in FIG. 1, and a second position as shown in FIG. 2 wherein the bead is disposed in axial register with a bead-seating groove 30 of the tire drum, a plurality of air cylinder devices 32 have their respective piston rods 34 attached to the second member so that the second member is moved by extension and retraction of the piston rods in the respective cylinders. The cylinders themselves are fixed on the stationary portion of the tire building machine (not shown).

The second member is provided with an axially facing surface 36 which is oriented toward the tire drum and preferably is inclined with respect to the drum axis to accommodate the inclination of the surface of the apex portion 38 of the bead. The apex portion of the assembled bead is of an uncured and easily deformed rubbery compound.

The axially facing surface is provided with a plurality of recesses 41 sunk in the surface 36 in an equally spaced circular array concentric with respect to the axis. Each recess accommodates a suction cup 43 the lips of which protrude outwardly from the surface sufficiently to engage and to seal to the surface of the apex so that suction may be applied to a plurality of local areas of the apex radially outwardly of the bead core. The assembled bead is carried, then, only by the deformable apex, not by the relatively rigid core.

To communicate between suction means and the several suction cups 43, an annular passage 45 in the second annular member is connected by individual passages 47 to the respective suction cups and by a pipe 49 or hose connection to a vacuum pump or equivalent, not shown. A plurality of fingers 51, 8 in the present apparatus, are equally angularly spaced in a circular array. Each finger is pivotally mounted on a pivot pin 53 so that each finger is swingable in a plane containing the axis of the tire drum. The front faces 55 of the fingers, namely, the faces oriented toward the tire building drum lie in a common plane normal to the axis which plane, in the position illustrated in FIG. 1, coincides at least approximately with the plane of the bead core locating surfaces 24. Each of the fingers is provided with a torsion spring 57 to bias the respective fingers to the position shown, that is, coplanar with the bead-locating surface. Minor adjustments of the position of the respective fingers is conveniently accommodated by an adjusting screw 59 in a tapped hole in a flange of the second annular member as is illustrated in FIG. 1. The face of each finger is extended radially inwardly to about the mean diameter of the inextensible bead core.

In operation of the apparatus, a tire bead assembly, which for simplicity is referred to here and in the claims as the bead, is formed by uniting an inextensible bead core comprising the conventional plurality of turns of wire or the like, with an apex formed of uncured but curable rubber of a suitable composition. The tire bead is prepared by methods and apparatus forming no part of the present invention. The bead so assembled is disposed concentrically about the axis of the drum by positioning the core 22 on the bead-locating surface 16 of the first member so that the bead also engages the locating surfaces 24 in the plane normal to the axis. The apex of the bead, as assembled, extends upwardly and is inclined or curved toward the building drum. With the second annular member 25 disposed as shown in FIG. 1, the surface of the apex lies touching or close to the lips of the respective suction cups 43 so as to seal the suction area of the suction cups to corresponding portions of the apex surface. With the bead thus positioned, suction is supplied in the annular passage 45 so that the apex itself is held by the suction cup sufficiently to avoid radial displacement of the bead. The radially inner portion of the bead then lies against the faces 55 of the respective fingers.

After the tire carcass band is disposed in cylindrical form about the drum, the second annular member 25 is moved by the cylinders 32 coaxially of the drum 14 so as to position the bead and particularly the bead core coaxially of and in appropriate register with the bead-seating groove 30 of the drum. It should be noted that the tire carcass band lies on the drum radially inwardly of the inner periphery of the bead. It is also to be noted that during movement of the bead from the first position (FIG. 1) of the member 25 surrounding the first annular member 12 to its second position illustrated in FIG. 2 surrounding the beadseating groove, the bead core is supported by the apex alone against any radial displacement.

With the bead positioned in axial register with the beadseating groove, the endless elastic member 61 disposed circumferentially of the drum is expanded by a plurality of segments 63 which are spaced circumferentially about the drum and underlie the elastic member. The expansion of the groove in the member 61 overlying the segments causes the tire carcass band to conform to the bead, particularly the bead core thereof so as to partially envelop the bead. Of necessity, this partial envelopment of the bead also envelops the radially inner extremities of the fingers 51. Because the bead is now held securely in its enveloped relation with the tire carcass band, the second annular member can now be moved axially away from the bead. To accomplish this, the fingers are allowed to swing in axial planes so that their radially inner extremities are withdrawn both axially and radially outwardly with respect to their initial position adjacent the bead core without in any way disturbing the accurate position given to the bead with respect to the tire carcass band. The suction pressure within the suction cups and passages is released immediately prior to the movement of the second member so that the entire bead remains in its desired axial register with respect to the carcass band. The second member 25 is then returned to the position illustrated in FIG. 1 to repeat the cycle. It should be noted that the stiffness of the torsion springs which control the position of the fingers should be sufficient only to insure that the fingers are restored to the position illustrated in FIG. 1 but less than sufficient to displace any part of the carcass band over which they are drawn.

While certain representative embodiments and details have been shown for the purpose of illustrating the invention, it will be apparent to those skilled in the art that various changes and modifications may be made therein without departing from the spirit or scope of the invention.

What is claimed is:

1. A tire building machine comprising a building drum having a first means defining an annular beadseating groove including an endless elastic member disposed circumferentially of the drum, a plurality of segments spaced circumferentially about said drum and underlying said member, the segments being movable radially of the drum to expand said member to seat a tire bead on a tire carcass band disposed on the drum; second means for positioning a tire bead relative to said groove, said bead including an apex and an inextensible bead core, said second means comprising a first annular member disposed coaxially of said drum and fixed axially apart therefrom, said member having an outer cylindrical surface for engaging the radially innner surface of said bead to locate said core concentrically of the axis of said drum, a second annular member mounted for movement coaxially of the drum and of the first member and having a radially inner surface spaced radially outward of the outer surface of said first member so as to be movable coaxially over the latter, and an axially facing surface oriented toward said drum and engageable with said apex outwardly of said core, a plurality of suction cups disposed in equally spaced circular array concentrically of the second member and radially outward of the core, each cup being accommodated in a corresponding recess formed in said axially facing surface of the second member and protruding therefrom sufficiently to seal and to apply suction to a plurality of local areas of said apex radially outward of said core, means communicating with said suction cups to effect suction therein, a plurality of fingers pivotally mounted in coaxially equally angular spaced circular array on said second member, extending radially inwardly therefrom at a plane normal to said axis to about the mean diameter of said bead core, and swingable in axial planes out of the plane normal to said axis and toward said drum, and means for moving said second annular member between a first position surrounding said first annular member and a second position surrounding said beadseating groove.

* * * * *